US012451759B2

(12) United States Patent
Shi et al.

(10) Patent No.: US 12,451,759 B2
(45) Date of Patent: Oct. 21, 2025

(54) DIRECT DRIVE TRANSMISSION SYSTEM

(71) Applicant: AAC Technologies (Nanjing) Co., Ltd., Nanjing (CN)

(72) Inventors: Weiling Shi, Nanjing (CN); Shun Guo, Nanjing (CN); Wanlun Wang, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 247 days.

(21) Appl. No.: 18/313,386

(22) Filed: May 8, 2023

(65) Prior Publication Data

US 2024/0171037 A1   May 23, 2024

Related U.S. Application Data

(63) Continuation of application No. PCT/CN2022/144286, filed on Dec. 30, 2022.

(30) Foreign Application Priority Data

Nov. 23, 2022 (CN) .......................... 202223125251.1

(51) Int. Cl.
*H02K 7/10* (2006.01)
*H02K 1/12* (2006.01)
*H02K 5/04* (2006.01)

(52) U.S. Cl.
CPC ................. *H02K 7/10* (2013.01); *H02K 1/12* (2013.01); *H02K 5/04* (2013.01)

(58) Field of Classification Search
CPC .. H02K 7/10; H02K 1/12; H02K 5/04; H02K 41/031; H02K 33/00; H02K 41/02; H02K 5/10
USPC ......................................................... 310/75 R
See application file for complete search history.

(56) References Cited

U.S. PATENT DOCUMENTS

| 2024/0171037 A1* | 5/2024 | Shi | ........................ H02K 1/12 |
| 2024/0178727 A1* | 5/2024 | Shi | ...................... H02K 1/2791 |
| 2024/0213870 A1* | 6/2024 | Shi | ...................... H02K 41/031 |

FOREIGN PATENT DOCUMENTS

| CN | 217159521 U | * | 8/2022 |
| CN | 116633191 A | * | 8/2023 |
| WO | WO 2022047936 | * | 3/2022 |

* cited by examiner

*Primary Examiner* — Ahmed Elnakib
(74) *Attorney, Agent, or Firm* — Wiersch Law Group

(57) ABSTRACT

The disclosure provides a direct drive transmission system including a mover unit and a stator unit driving the mover unit to move. The stator unit includes a stator assembly, two first end covers, and two first guide rails. A side of the first end cover close to the first guide rail is recessed inwardly to form a first mounting groove, and two ends of the first guide rail are respectively inserted into the first mounting groove. The mover unit includes a mover assembly, two second end covers, and two second guide rails. A side of the second end cover close to the second guide rail is recessed inwardly to form a second mounting groove, two ends of the second guide rail are respectively inserted into the second mounting groove. The stator assembly drives the mover assembly to cause the second guide rail to move on the first guide rail.

7 Claims, 5 Drawing Sheets

DIRECT DRIVE TRANSMISSION SYSTEM

TECHNICAL FIELD

The disclosure relates to the technical field of transmission systems, and in particular, to a direct drive transmission system.

BACKGROUND

With the development of a direct drive transmission system technology, a direct drive transmission system has been widely used in various direct drive motors.

The direct drive transmission system in the related art includes a plurality of stators and a plurality of movers. The stators drives the movers to move to form a linear drive effect. In an existing direct drive transmission system, a guide rail and an end cover of the direct drive transmission system are generally flush or keep a certain mounting distance to facilitate linear motion of the movers.

However, in the related art, fit between the guide rail and the end cover is not tight enough. As a result, a size of the direct drive motor cannot meet a usage scenario, an assembly effect is poor, and a bearing capacity is low.

Therefore, there is a need to provide a new direct drive transmission system to solve the above problems.

SUMMARY

The technical problem to be solved in the disclosure is to provide a direct drive transmission system that is easy to assemble and has a guide rail and an end cover that are compact, so as to reduce length dimensions of a motor.

In order to solve the above technical problem, the disclosure provides a direct drive transmission system, wherein the direct drive transmission system includes a mover unit and a stator unit driving the mover unit to move;

the stator unit including a stator assembly, two first end covers fixed to two opposite circumferential sides of the stator assembly, and two first guide rails fixed to a side of the stator assembly close to the mover unit and extending along a motion direction of the mover unit, the two first guide rails being arranged in parallel and spaced apart; a side of each of the first end covers close to each of the first guide rails being recessed inwardly to form a first mounting groove, two ends of the first guide rail being respectively inserted into the first mounting groove; and the mover unit including a mover assembly, two second end covers fixed to two opposite circumferential sides of the mover assembly, and two second guide rails fixed to a side of the mover assembly close to the stator unit and extending along the motion direction of the mover unit, the two second guide rails being arranged in parallel and spaced apart; the two second end covers being respectively arranged directly opposite to and apart from the two first end covers, the two second guide rails respectively abutting against the two first guide rails to form a slidable connection; a side of each of the second end covers close to each of the second guide rails being recessed inwardly to form a second mounting groove, two ends of the second guide rail being respectively inserted into the second mounting groove; the stator assembly driving the mover assembly to cause the second guide rail to move on the first guide rail.

As an improvement, both the first mounting groove and the second mounting groove have rectangular structures.

As an improvement, the stator assembly includes a base fixed to a side of the first guide rail away from the mover unit and a first drive unit fixed to a side of the base close to the mover unit; and the mover assembly includes a slide fixed to a side of the second guide rail away from the stator unit and a second drive unit fixed to a side of the slide close to the first drive unit, the second drive unit being arranged directly opposite to and apart from the first drive unit; and the first drive unit and the second drive unit generating mutual thrust to drive the slide to drive the second guide rail to move linearly along the first guide rail of the base.

As an improvement, the stator assembly further includes a first position feedback device fixed to a side of the base close to the mover unit, and the mover assembly further includes a second position feedback device fixed to a side of the slide close to the stator unit, the second position feedback device being arranged directly opposite to and apart from the first position feedback device and configured to read a position of the mover assembly relative to the stator assembly.

As an improvement, the first drive unit includes a yoke fixed to the base and a plurality of permanent magnets fixed to the yoke and arranged along a length direction of the first guide rail; and the second drive unit includes a plurality of iron cores fixed to the slide and arranged along a length direction of the second guide rail and drive windings respectively wound around each of the iron cores, each of the permanent magnets being spaced apart from and directly opposite to one of the drive windings.

As an improvement, the first position feedback device is a linear encoder; and the second position feedback device is a linear encoder read head, the linear encoder being arranged apart from and directly opposite to the linear encoder read head.

As an improvement, a groove depth of the first mounting groove along a thickness direction of the first guide rail is equal to a thickness of the first guide rail; and a groove depth of the second mounting groove along a thickness direction of the second guide rail is equal to a thickness of the second guide rail.

Compared with the related art, in the direct drive transmission system of the disclosure, the stator unit drives the mover unit to realize linear motion. The stator unit includes a stator assembly, two first end covers fixed to two opposite circumferential sides of the stator assembly, and two first guide rails fixed to a side of the stator assembly close to the mover unit and extending along a motion direction of the mover unit. The two first guide rails are arranged in parallel and spaced apart. A side of the first end cover close to the first guide rail is recessed inwardly to form a first mounting groove, and two ends of the first guide rail are respectively inserted into the first mounting groove. The mover unit includes a mover assembly, two second end covers fixed to two opposite circumferential sides of the mover assembly, and two second guide rails fixed to a side of the mover assembly close to the stator unit and extending along the motion direction of the mover unit. The two second guide rails are arranged in parallel and spaced apart. The two second end covers are respectively arranged directly opposite to and apart from the two first end covers, and the two second guide rails respectively abut against the two first guide rails to form a slidable connection. A side of the second end cover close to the second guide rail is recessed inwardly to form a second mounting groove, and two ends of the second guide rail are respectively inserted into the second mounting groove. The stator assembly drives the mover assembly to cause the second guide rail to move on the first guide rail. In this way, the guide rail and the end cover fit tightly. Under a same guide rail length, a direct drive motor is more compact in size and easy to assemble.

BRIEF DESCRIPTION OF DRAWINGS

In order to more clearly illustrate the technical solutions in the embodiments of the disclosure, the accompanying drawings used in the description of the embodiments will be briefly introduced below. It is apparent that, the accompanying drawings in the following description are only some embodiments of the disclosure, and other drawings can be obtained by those of ordinary skill in the art from the provided drawings without creative efforts.

DESCRIPTION OF EMBODIMENTS

Figure 1:
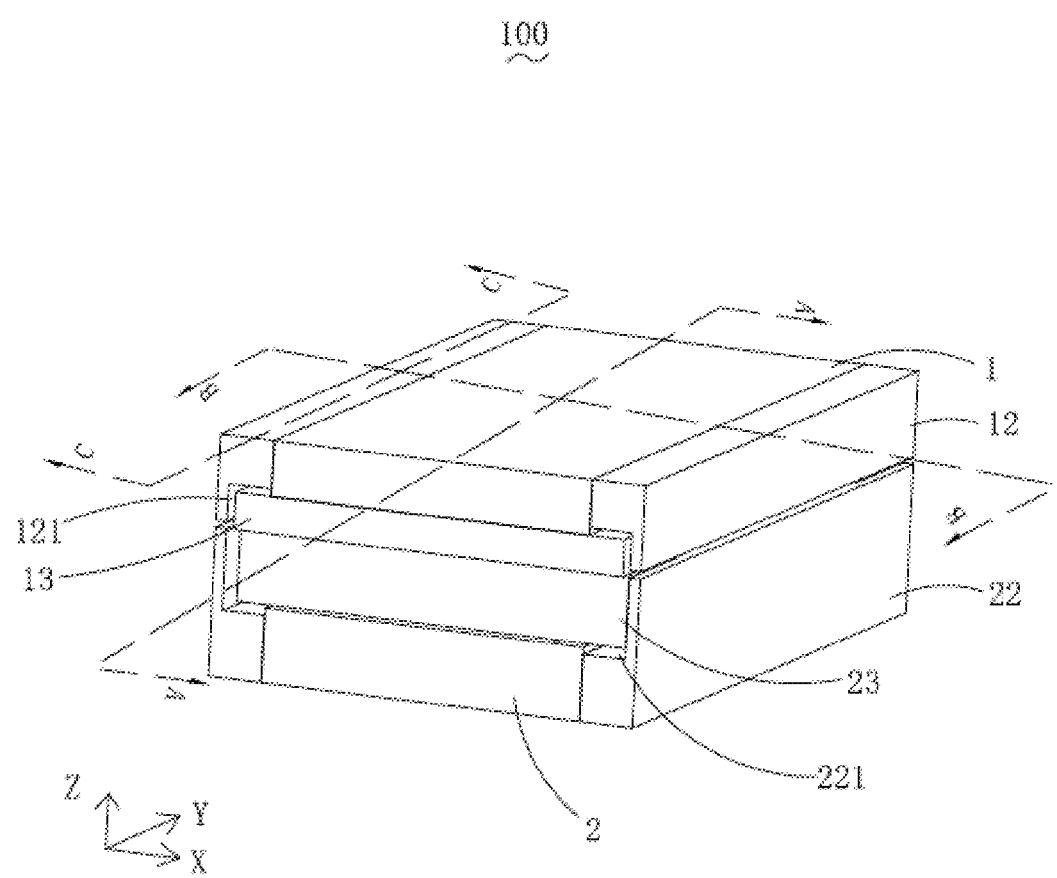
FIG. 1 is a schematic diagram of a three-dimensional structure of a direct drive transmission system according to the disclosure.
Figure 2:
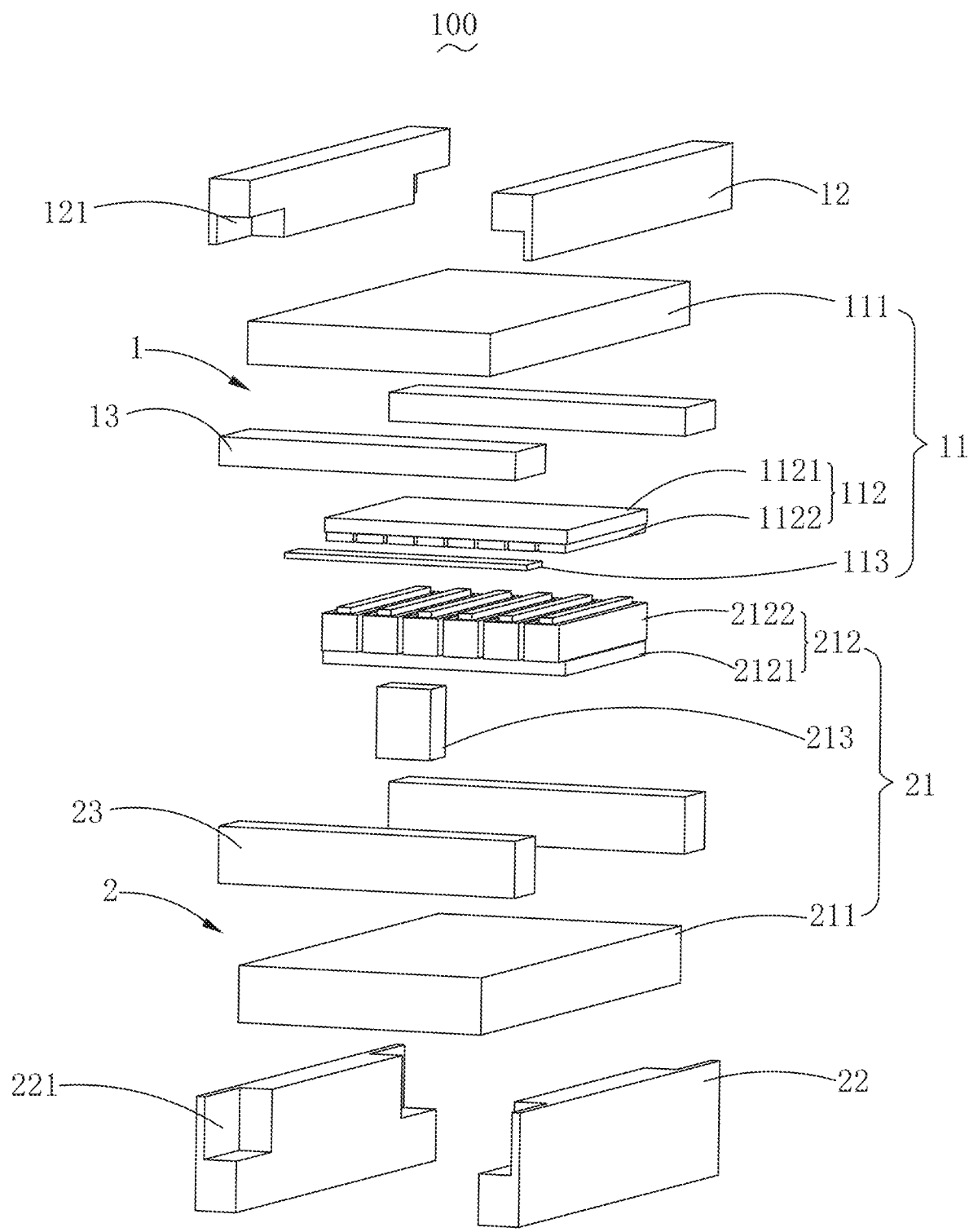
FIG. 2 is a schematic diagram of an exploded structure of the direct drive transmission system according to the disclosure.
Figure 3:
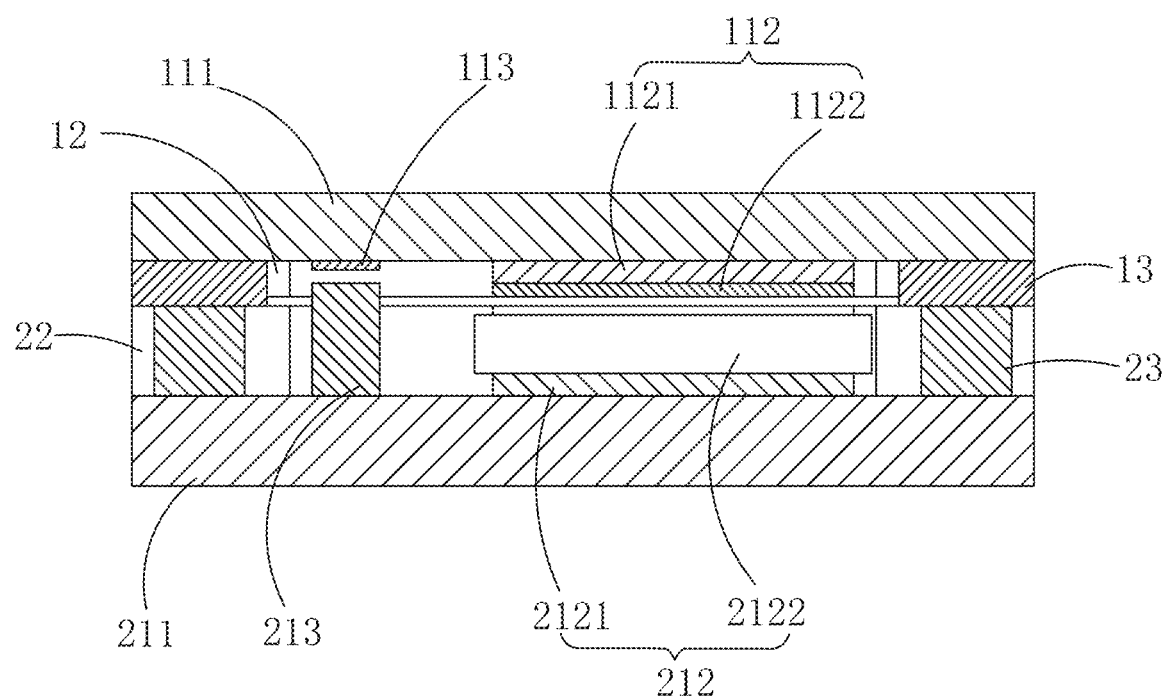
FIG. 3 is a sectional view taken along a line A-A in FIG. 1.
Figure 4:
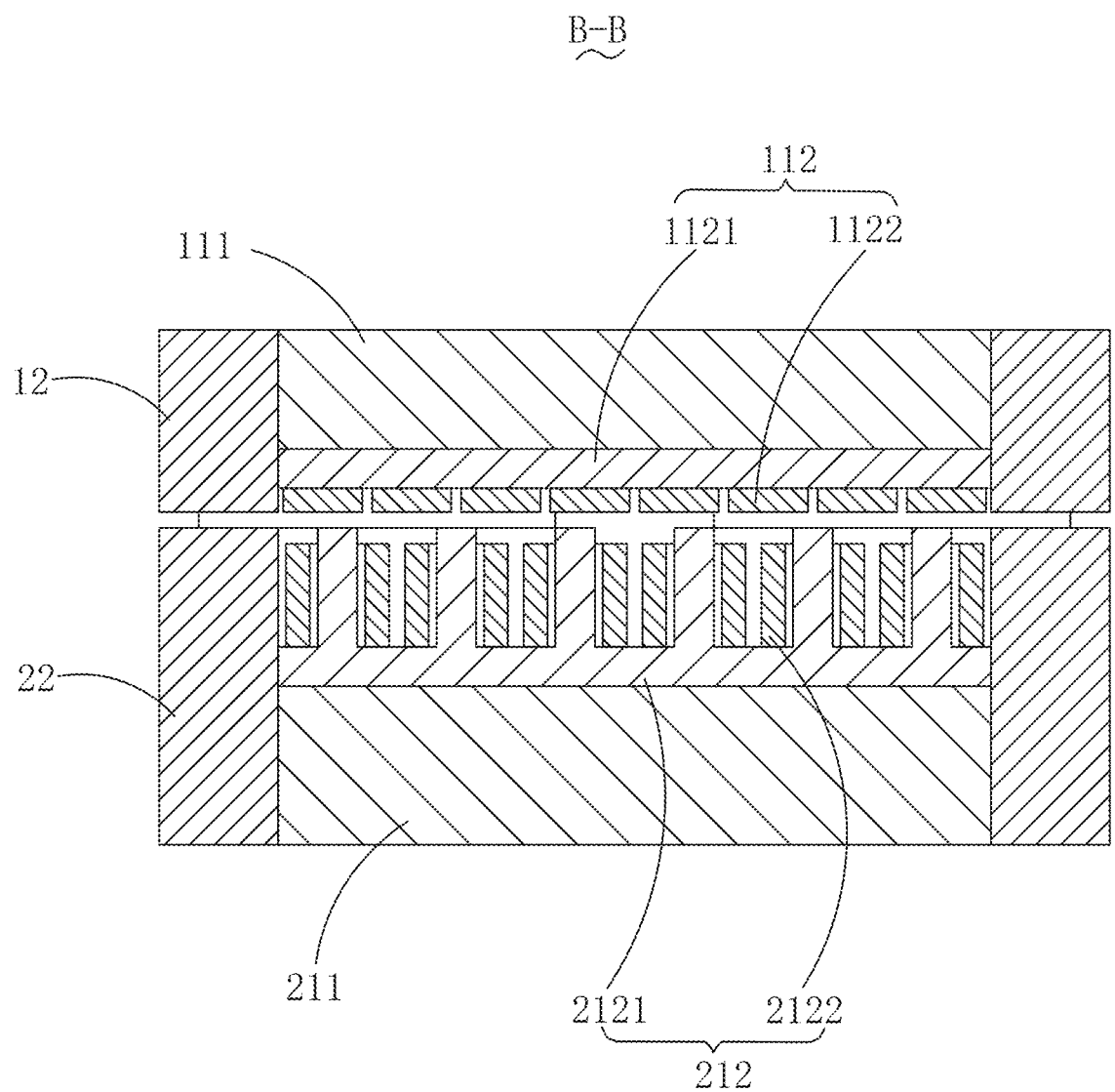
FIG. 4 is a sectional view taken along a line B-B in FIG. 1.
Figure 5:
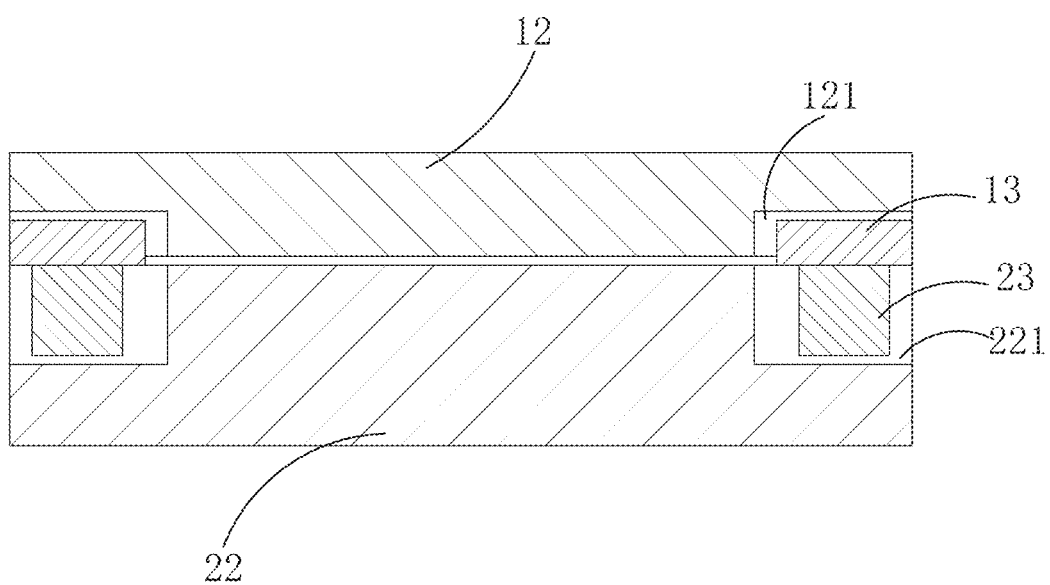
FIG. 5 is a sectional view taken along a line C-C in FIG. 1.

The technical solutions in the embodiments of the disclosure will be clearly and completely described below with reference to the accompanying drawings in the embodiments of the disclosure. Obviously, the described embodiments are only part of instead of all of the embodiments of the disclosure. Based on the embodiments in the disclosure, all other embodiments obtained by those of ordinary skill in the art without creative efforts fall within the protection scope of the disclosure.

Referring to FIG. 1 to FIG. 5, a direct drive transmission system 100 is provided. The direct drive transmission system 100 includes a mover unit 2 and a stator unit 1 for driving the mover unit 2 to move. The mover unit 2 is driven by the stator unit 1 to perform linear motion thereon.

The stator unit 1 includes a stator assembly 11, two first end covers 12 fixed to two opposite circumferential sides of the stator assembly 11, and two first guide rails 13 fixed to a side of the stator assembly 11 close to the mover unit 2 and extending along a motion direction of the mover unit 2. The two first guide rails 13 are arranged in parallel and spaced apart. A side of the first end cover 12 close to the first guide rail 13 is recessed inwardly to form a first mounting groove 121, and two ends of the first guide rail 13 are respectively inserted into the first mounting groove 121. Therefore, the first guide rail 13 and the first end cover 12 fit more tightly, and a fixing effect is good.

The mover unit 2 includes a mover assembly 21, two second end covers 22 fixed to two opposite circumferential sides of the mover assembly 21, and two second guide rails 23 fixed to a side of the mover assembly 21 close to the stator unit 1 and extending along the motion direction of the mover unit 2. The two second guide rails 23 are arranged in parallel and spaced apart. The second end cover 22 is arranged directly opposite to and apart from the first end cover 12, and the two second guide rails 23 respectively abut against the two first guide rails 13 to form a slidable connection. A side of the second end cover 22 close to the second guide rail 23 is recessed inwardly to form a second mounting groove 221, and two ends of the second guide rail 23 are respectively inserted into the second mounting groove 221. The stator assembly 11 drives the mover assembly 21 to cause the second guide rail 23 to move on the first guide rail 13. In this way, the guide rail and the end cover fit tightly. Under a same guide rail length, a direct drive motor is more compact in size and easy to assemble. Under a same shape length of the motor, a number of rollers in the first guide rail 13 and the second guide rail 23 can be increased to improve a bearing capacity.

A primary magnetic field is generated by the stator assembly 11, the stator assembly 11 and the mover assembly 21 are directly opposite to each other, and thrust generated between the stator assembly 11 and the mover assembly 21 is used to drive the second guide rail 23 of the mover unit 2 to move linearly on the first guide rail 13 of the stator unit 1.

As an improvement, a plurality of stator units 1 may be provided, and a plurality of mover units 2 may also be provided. The plurality of stator units 1 and the plurality of mover units 2 are arranged directly opposite and apart. The plurality of mover units 2 are driven by the plurality of stator units 1 to realize circular linear motion. The motion direction of the mover unit 2 can be controlled by adjusting a driving direction of a magnetic field of the stator unit 1.

In this embodiment, both the first mounting groove 121 and the second mounting groove 221 have rectangular structures. The first guide rail 13 and the second guide rail 23 have rectangular structures. Both the first mounting groove 121 and the second mounting groove 221 are arranged as rectangular structures, to facilitate respective mounting of two ends of the first guide rail 13 and two ends of the second guide rail 23 in the first mounting groove 121 and the second mounting groove 221, so that the first end cover 12 and the first guide rail 13 are assembled compactly, and the second end cover 22 and the second guide rail 23 are assembled compactly. In this way, a size in a length direction of the motor can be reduced, and compactness of the motor can be improved.

In this embodiment, the stator assembly 11 includes a base 111 fixed to a side of the first guide rail 13 away from the mover unit 2 and a first drive unit 112 fixed to a side of the base 111 close to the mover unit 2. The mover assembly 21 includes a slide 211 fixed to a side of the second guide rail 23 away from the stator unit 1 and a second drive unit 212 fixed to a side of the slide 211 close to the first drive unit 112. The second drive unit 212 is arranged directly opposite to and apart from the first drive unit 112. The first drive unit 112 and the second drive unit 212 generate mutual thrust to drive the slide 211 to drive the second guide rail 23 to move linearly along the first guide rail 13 of the base 111.

As an improvement, when the base 111 is fixed, driving thrust is generated between the first drive unit 112 and the second drive unit 212, so that the slide 211 fixed to the second drive unit 212 can move linearly under the action of the thrust.

When the slide 211 is fixed, driving thrust is generated between the first drive unit 112 and the second drive unit 212, so that the base 111 fixed to the first drive unit 112 can move linearly under the action of the thrust.

In this embodiment, the stator assembly 11 further includes a first position feedback device 113 fixed to a side of the base 111 close to the mover unit 2, and the mover assembly 21 further includes a second position feedback device 213 fixed to a side of the slide 211 close to the stator unit 1. The second position feedback device 213 is arranged directly opposite to and apart from the first position feedback device 113 and configured to read a position of the mover assembly 21 relative to the stator assembly 11. Through position information collection between the first position feedback device 113 and the second position feedback device 213, the mover assembly 21 can be positioned, and positioning accuracy is high.

In this embodiment, the first drive unit 112 includes a yoke 1121 fixed to the base 111 and a plurality of permanent magnets 1122 fixed to the yoke 1121 and arranged along a moving direction of the mover unit 2. The moving direction of the mover unit 2 is a X direction as shown in FIG. 1. The second drive unit 212 includes a plurality of iron cores 2121 fixed to the slide 211 and arranged along the moving direction of the mover unit 2 and drive windings 2122 respectively wound around each of the iron cores 2121. Each of the permanent magnets 1122 is spaced apart from and directly opposite to one of the drive windings 2122. The plurality of drive windings 2122 are activated to generate a magnetic field to form thrust with the permanent magnet 1122, for pushing the second drive unit 212 to move. The plurality of drive windings 2122 are fixed in the iron core 2121 to increase the magnetic field of the drive winding 2122, so as to better drive the second drive unit 212 to move linearly. The plurality of permanent magnets 1122 are fixed to one side of the yoke 1121, and the other side of the yoke 1121 is fixed to the base 111, so that a magnetic field force is always generated by the plurality of permanent magnets 1122. When an appropriate current is applied to the drive winding 2122, the drive winding 2122 generates a primary traveling wave magnetic field, the permanent magnet 1122 generates a secondary magnetic field, and thrust is generated between the drive winding 2122 and the permanent magnet 1122 to drive the slide 211 to move linearly on the base 111.

As an improvement, the plurality of permanent magnets 1122 are arranged side by side and fixed apart to the yoke 1121.

As an improvement, the plurality of drive windings 2122 are arranged side by side and evenly apart on a side of the iron core 2121 close to the first drive unit 112, so the magnetic field is uniform and a driving effect is good.

In this embodiment, the first position feedback device 113 is a linear encoder, the second position feedback device 213 is a linear encoder read head, and the linear encoder is arranged directly opposite to the linear encoder read head. The linear encoder read head is configured to identify position information fed back by the second position feedback device 213, so as to facilitate real-time positioning of the mover unit 2.

The linear encoder is an incremental linear encoder. A measurement principle of the linear encoder involves modulating light into Moire fringes through two gratings moving relative to each other, obtaining a displacement variation by counting and subdividing the Moire fringes, and setting one or more reference points on a ruler grating to determine positions. As an improvement, the linear encoder is mounted on the mover unit 2, and the linear encoder has high feedback position accuracy. The linear encoder is arranged directly opposite to the read head, so that the read head can identify information of the linear encoder in real time, bringing high read and write identification efficiency and a good positioning effect.

As an improvement, the linear encoder is mounted on the base 111, the read head is mounted on the slide 211, and the linear encoder is arranged directly opposite to the linear encoder read head.

As an improvement, the linear encoder is an optical grating or a magnetic grating. The optical grating or magnetic grating has low costs. The linear encoder is not limited to the optical grating or magnetic grating.

In this embodiment, a groove depth of the first mounting groove 121 along an arrangement direction of the stator unit 1 and the mover unit 2 is equal to a thickness of the first guide rail 13. The arrangement direction of the stator unit 1 and the mover unit 2 is a Z direction as shown in FIG. 1. A groove depth of the second mounting groove 221 along the arrangement direction of the stator unit 1 and the mover unit 2 is equal to a thickness of the second guide rail 221. Therefore, the first end cover 12 and the first guide rail 13 are mounted compactly, and the second end cover 22 and the second guide rail 23 are mounted compactly.

Compared with the related art, the stator unit drives the mover unit to realize linear motion. The stator unit includes a stator assembly, two first end covers fixed to two opposite circumferential sides of the stator assembly, and two first guide rails fixed to a side of the stator assembly close to the mover unit and extending along a motion direction of the mover unit. The two first guide rails are arranged in parallel and spaced apart. A side of the first end cover close to the first guide rail is recessed inwardly to form a first mounting groove, and two ends of the first guide rail are respectively inserted into the first mounting groove. The mover unit includes a mover assembly, two second end covers fixed to two opposite circumferential sides of the mover assembly, and two second guide rails fixed to a side of the mover assembly close to the stator unit and extending along the motion direction of the mover unit. The two second guide rails are arranged in parallel and spaced apart. The two second end covers are respectively arranged directly opposite to and apart from the two first end covers, and the two second guide rails respectively abut against the two first guide rails to form a slidable connection. A side of the second end cover close to the second guide rail is recessed inwardly to form a second mounting groove, and two ends of the second guide rail are respectively inserted into the second mounting groove. The stator assembly drives the mover assembly to cause the second guide rail to move on the first guide rail. In this way, the guide rail and the end cover fit tightly. Under a same guide rail length, the direct drive motor is more compact in size and easy to assemble.

The above descriptions are only embodiments of the disclosure. It should be pointed out herein that, for those of ordinary skill in the art, improvements can also be made without departing from the creative concept of the disclosure, all of which fall within the protection scope of the disclosure.

What is claimed is:
1. A direct drive transmission system, comprising a mover unit and a stator unit driving the mover unit to move;
wherein the stator unit comprises a stator assembly, two first end covers fixed to two opposite circumferential sides of the stator assembly, and two first guide rails fixed to a side of the stator assembly facing to the mover unit and extending along a motion direction of the mover unit, the two first guide rails are arranged in parallel and spaced apart from each other; a side of each of the two first end covers facing to one first guide rail of the two first guide rails is recessed inwardly to form a first mounting groove, two ends of the first guide rail are respectively inserted into the first mounting groove;

wherein the mover unit comprises a mover assembly, two second end covers fixed to two opposite circumferential sides of the mover assembly, and two second guide rails fixed to a side of the mover assembly facing to the stator unit and extending along the motion direction of the mover unit, wherein the two second guide rails are arranged in parallel and spaced apart from each other;

wherein the two second end covers are respectively arranged directly opposite to and apart from the two first end covers, the two second guide rails respectively abut against the two first guide rails to form a slidable connection; a side of each of the two second end covers facing to one of the two second guide rails is recessed inwardly to form a second mounting groove, two ends of the second guide rail are respectively inserted into the second mounting groove; and the stator assembly drives the mover assembly to cause each second guide rail of the two second guide rails to move on a corresponding first guide rail of the two first guide rails.

2. The direct drive transmission system as described in claim 1, wherein each of the first mounting groove and the second mounting groove has a rectangular structure.

3. The direct drive transmission system as described in claim 1, wherein the stator assembly comprises a base fixed to a side of the first guide rail away from the mover unit and a first drive unit fixed to a side of the base facing to the mover unit;

wherein the mover assembly comprises a slide fixed to a side of the second guide rail away from the stator unit and a second drive unit fixed to a side of the slide facing to the first drive unit, and the second drive unit is arranged directly opposite to and apart from the first drive unit; and wherein the first drive unit and the second drive unit generate mutual thrust to drive the slide to bring the second guide rail to move linearly along the first guide rail of the base.

4. The direct drive transmission system as described in claim 3, wherein the stator assembly further comprises a first position feedback device fixed to a side of the base facing to the mover unit, and the mover assembly further comprises a second position feedback device fixed to a side of the slide facing to the stator unit, wherein the second position feedback device is arranged directly opposite to and spaced apart from the first position feedback device and configured to read a position of the mover assembly relative to the stator assembly.

5. The direct drive transmission system as described in claim 4, wherein the first position feedback device is a linear encoder; and the second position feedback device is a linear encoder read head, the linear encoder being arranged apart from and directly opposite to the linear encoder read head.

6. The direct drive transmission system as described in claim 3, wherein the first drive unit comprises a yoke fixed to the base and permanent magnets fixed to the yoke and arranged along a moving direction of the mover unit; and the second drive unit comprises iron cores fixed to the slide and arranged along the moving direction of the mover unit and drive windings respectively wound around each of the iron cores, and each of the permanent magnets is spaced apart from and directly opposite to a corresponding drive winding of the drive windings.

7. The direct drive transmission system as described in claim 1, wherein a groove depth of the first mounting groove along an arrangement direction of the stator unit and the mover unit is equal to a thickness of the first guide rail; and a groove depth of the second mounting groove along the arrangement direction of the stator unit and the mover unit is equal to a thickness of the second guide rail.

* * * * *